(12) United States Patent
Lee

(10) Patent No.: US 9,634,783 B2
(45) Date of Patent: *Apr. 25, 2017

(54) SYSTEMS AND METHODS FOR SERIAL PACKET SYNCHRONIZATION IN A VOICE PROCESSING SYSTEM

(75) Inventor: Robert J. Lee, Lawrenceville, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1616 days.

This patent is subject to a terminal disclaimer.

(21) Appl. No.: 12/577,526

(22) Filed: Oct. 12, 2009

(65) Prior Publication Data

US 2010/0040051 A1 Feb. 18, 2010

Related U.S. Application Data

(63) Continuation of application No. 10/689,935, filed on Oct. 22, 2003, now Pat. No. 7,602,816.

(Continued)

(51) Int. Cl.
*H04J 3/06* (2006.01)
*H04L 7/04* (2006.01)

(52) U.S. Cl.
CPC ............ *H04J 3/0685* (2013.01); *H04L 7/041* (2013.01)

(58) Field of Classification Search
CPC .............. H04L 12/28; H04L 9/00; H04L 9/32

(Continued)

(56) References Cited

U.S. PATENT DOCUMENTS 3,510,777 A * 5/1970 Gordon ............... 340/7.45
4,002,834 A * 1/1977 Cocci et al. ......... 375/362

(Continued)

OTHER PUBLICATIONS

Office Action for U.S. Appl. No. 09/501,850, dated Jun. 20, 2003, 12 pages.

(Continued)

*Primary Examiner* — Ricky Ngo
*Assistant Examiner* — Dewanda Samuel
(74) *Attorney, Agent, or Firm* — Sterne, Kessler, Goldstein & Fox P.L.L.C.

(57) ABSTRACT

A serial packet sync encoder is used to encode a serial packet sync datastream. In an embodiment, the serial packet sync datastream is made up of the packet sync vector and a unique preamble bit sequence that is preselected. In another embodiment, the serial packet sync datastream is made up of a non-unique bit sequence. A serial packet sync transmitter is used to transmit the serial packet sync datastream. A serial packet sync receiver is provided for receiving the serial packet sync datastream. In an embodiment, the serial packet sync transmitter and the serial packet sync receiver are shift registers. In this way, the serial packet sync datastream can be transmitted and received using only a single pin. The serial packet sync datastream is useful for providing an indication that an event, such as a grant arrival, has occurred. A preamble comparator is provided to compare the received serial packet sync datastream and the preselected preamble to determine if the two match. In cases where a match is made, the packet sync vector is written into a holding register for access from other applications and or system components such as a digital signal processor.

10 Claims, 9 Drawing Sheets

Related U.S. Application Data

(60) Provisional application No. 60/439,461, filed on Jan. 13, 2003.

(58) Field of Classification Search
USPC .................................................. 370/321, 509
See application file for complete search history.

(56) References Cited

U.S. PATENT DOCUMENTS

| | | | |
|---|---|---|---|
| 5,068,880 A * | 11/1991 | Kline et al. .................... | 375/368 |
| 5,140,618 A * | 8/1992 | Kinoshita et al. ............ | 375/368 |
| 5,267,263 A | 11/1993 | Feezel et al. | |
| 5,550,831 A * | 8/1996 | Tanahashi ..................... | 370/321 |
| 5,678,060 A * | 10/1997 | Yokoyama et al. .......... | 709/212 |
| 5,963,557 A | 10/1999 | Eng | |
| 6,075,787 A | 6/2000 | Bobeck et al. | |
| 6,225,921 B1 * | 5/2001 | Kahlman .............. | H03M 5/145 |
| | | | 341/58 |
| 6,490,727 B1 | 12/2002 | Nazarathy et al. | |
| 6,549,584 B1 | 4/2003 | Gatherer et al. | |
| 6,621,812 B1 | 9/2003 | Chapman et al. | |
| 6,629,288 B1 * | 9/2003 | Bernath et al. ............... | 714/807 |
| 6,769,093 B1 | 7/2004 | Krieger | |
| 6,807,193 B1 | 10/2004 | Beser | |
| 6,807,195 B1 | 10/2004 | Moore, Jr. et al. | |
| 6,829,317 B2 * | 12/2004 | Mege et al. .................. | 375/368 |
| 6,834,057 B1 | 12/2004 | Rabenko et al. | |
| 6,847,635 B1 | 1/2005 | Beser | |
| 6,950,399 B1 * | 9/2005 | Bushmitch et al. .......... | 370/236 |
| 6,956,865 B1 | 10/2005 | Khaunte et al. | |
| 6,973,096 B2 * | 12/2005 | Chappell et al. ............. | 370/468 |
| 6,975,652 B1 * | 12/2005 | Mannette et al. ............. | 370/503 |
| 7,085,287 B1 | 8/2006 | Chapman | |
| 7,194,009 B2 * | 3/2007 | Eng ............................... | 370/480 |
| 7,218,901 B1 | 5/2007 | Mobley et al. | |
| 7,298,762 B2 | 11/2007 | Rakib | |
| 7,801,176 B2 * | 9/2010 | Rabenko et al. ............. | 370/468 |
| 2001/0046266 A1 * | 11/2001 | Rakib et al. .................. | 375/259 |
| 2001/0055311 A1 * | 12/2001 | Trachewsky et al. ........ | 370/445 |
| 2002/0061012 A1 * | 5/2002 | Thi et al. ...................... | 370/352 |
| 2003/0123381 A1 * | 7/2003 | Zhuang ..................... | H04B 7/04 |
| | | | 370/208 |
| 2004/0150537 A1 | 8/2004 | Coles et al. | |

OTHER PUBLICATIONS

Office Action for U.S. Appl. No. 09/501,850, dated Oct. 6, 2003, 8 pages.

Office Action for U.S. Appl. No. 09/501,850, dated Mar. 9, 2004, 13 pages.

* cited by examiner

SYSTEMS AND METHODS FOR SERIAL PACKET SYNCHRONIZATION IN A VOICE PROCESSING SYSTEM

This application is a continuation of U.S. Non-Provisional application Ser. No. 10/689,935, filed Oct. 22, 2003, which claims the benefit of priority to U.S. Provisional Application No. 60/439,461, filed Jan. 13, 2003, all of which are incorporated in their entirety herein by reference.

BACKGROUND OF THE INVENTION

Field of the Invention

The present invention relates generally to communications networking and more specifically to synchronizing bit-rate sampled data transmissions in a communications network.

Related Art

Advances in Voice over Internet Protocol (VOIP) technology and systems have resulted in VoIP telephony becoming the technology of choice for many telephony carriers. In VoIP systems, digital signal processors are used to digitize voice calls by taking periodic samples of the traffic. These samples are then applied to an analog to digital converter. The digitized samples are then arranged into a packet. In a cable modem system, these packets are further processed by the media access controller (MAC) of a cable modem for eventual transmission through the network.

Timing or latency issues are important for voice applications in a packet based transport network. In order to minimize latency, some applications provide an indication of transmission bandwidth availability to the VoIP processing agent. In this way, the VoIP processing agent is able to synchronize its operation with the expected availability of transmission bandwidth. A method for providing such an indication is described in commonly owned U.S. patent application Ser. No. 09/501,850, filed Feb. 10, 2000, now pending, and is incorporated by reference herein in its entirety. The method described in the above application, however, relies upon a parallel style interface. More specifically, the interface relies upon multiple pins to convey signals to the VoIP processing agent. For example, in the case where a bandwidth grant is received, five pins might be required to communicate the vector identifying the queue for which the grant has been issued. A parallel interface works well where the cost of multiple parallel signals is not an issue, such as in a large ASIC where both the DOCSIS MAC and VoIP processing agent are integrated. However, as the voice product market changes and expands, configurations of products have emerged where the DOCSIS MAC and voice processing agents are distributed into separate integrated circuits. Despite the distributed functionality, it is still necessary to provide packet sync information between the MAC integrated circuits and the VoIP processing agent integrated circuits.

Therefore, in order to minimize the cost of such integrated circuits, a need exists to reduce the number of pins on each device. More specifically, a need exists for a serial encoding protocol which allows packet sync information to be conveyed via a single pin on each integrated circuit.

BRIEF SUMMARY OF THE INVENTION

The present invention solves the above problems by providing methods and systems for communicating transmission bandwidth availability via a serial interface, hereafter referred to as serial packet synchronization. A media access controller (such as, a cable modem) is provided to receive a grant. In response to receipt of the grant, the media access controller asserts a vector which represents the queue number (service flow) for which the grant was received, referred to as a packet sync vector. A serial packet sync encoder is used to encode a serial packet sync datastream. The serial packet sync datastream is a bit sequence. In an embodiment, the serial packet sync datastream is made up of the packet sync vector and a unique preamble bit sequence that is preselected. In another embodiment, the serial packet sync datastream is made up of a non-unique bit sequence. Once the serial packet sync datastream has been encoded, a serial packet sync transmitter is used to transmit the serial packet sync datastream. In an embodiment, the serial packet sync transmitter is a shift register. In this way, the serial packet sync datastream can be transmitted using only a single data pin. The serial packet sync datastream is useful for providing an indication that an event, such as a grant arrival, has occurred.

The serial packet sync datastream can be transmitted to any system or application for which receipt of an indication that an event has occurred is necessary or advantageous. For example, a voice processing system prepares voice data packets for transmission during designated grant opportunities. Thus, in an embodiment, a serial packet sync receiver is provided for receiving the serial packet sync datastream. The serial packet sync receiver is a shift register. In this way, the serial packet sync datastream can be received using only a single data pin. A preamble comparator is provided to compare the received serial packet sync datastream and the preselected preamble to determine if the two match. In cases where a match is made, the packet sync vector is written into a holding register. An interrupt could be issued in response to recording of the packet sync vector into the holding register. In a voice processing system, such an interrupt could be used to trigger operation of a digital signal processing application associated with the service flow indicated by the packet sync vector. Further features and advantages of the present invention, as well as the structure and operation of various embodiments of the present invention, are described in detail below.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

Figure 1:
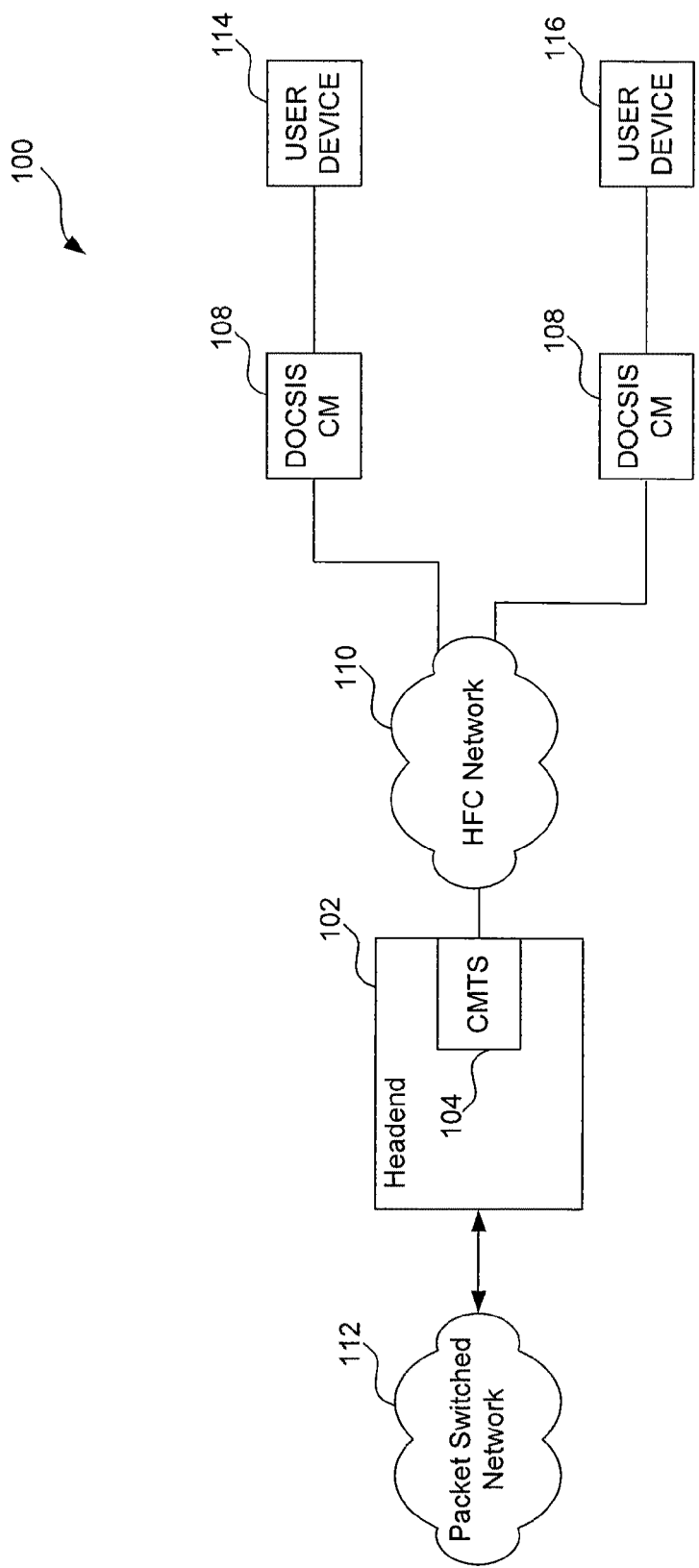
FIG. 1 is a high level block diagram of a cable modem system configured for voice processing in accordance with embodiments of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

A. Cable Modem System in Accordance with Embodiments of the Present Invention

FIG. 1 is a high level block diagram of an example cable modem system 100 in accordance with embodiments of the present invention. The cable modem system 100 enables voice communications, video and data services based on a bi-directional transfer of packet-based traffic, such as Internet protocol (IP) traffic, between a cable system headend 102 and a plurality of cable modems 108 over a hybrid fiber-coaxial (HFC) cable network 110. In the example cable modem system 100, only two cable modems 108 are shown for clarity. In general, any number of cable modems 108 can be included in the cable modem system of the present invention.

The cable headend 102 is comprised of at least one cable modem termination system (CMTS) 104. The CMTS 104 is the portion of the cable headend 102 that manages the upstream and downstream transfer of data between the cable headend 102 and the cable modems 108, which are located at the customer premises. The CMTS 104 broadcasts information downstream to the cable modems 108 as a continuous transmitted signal in accordance with a time division multiplexing (TDM) technique. Additionally, the CMTS 104 controls the upstream transmission of data from the cable modems 108 to itself by assigning to each cable modem 108 short grants of time within which to transfer data. In accordance with this transmission bandwidth allocation, each cable modem 108 can only send information upstream as short burst signals during a transmission opportunity or grant allocated to it by the CMTS 104.

As shown in FIG. 1, the CMTS 102 further serves as an interface between the HFC network 110 and a packet-switched network 112, transferring IP packets received from the cable modems 108 to the packet-switched network 112 and transferring IP packets received from the packet-switched network 112 to the cable modems 108 when appropriate. In embodiments, the packet-switched network 112 comprises the Internet.

In addition to the CMTS 104, the cable headend 102 can also include one or more Internet routers to facilitate the connection between the CMTS 104 and the packet-switched network 112, as well as one or more servers for performing necessary network management tasks.

The HFC network 110 provides a point-to-multipoint topology for the high-speed, reliable, and secure transport of data between the cable headend 102 and the cable modems 108 at the customer premises. As will be appreciated by persons skilled in the relevant art(s), the HFC network 110 can comprise coaxial cable, fiberoptic cable, or a combination of coaxial cable and fiberoptic cable linked via one or more fiber nodes.

Each of the cable modems 108 operate as an interface between the HFC network 110 and at least one attached user device. In particular, the cable modems 108 perform the functions necessary to convert downstream signals received over the HFC network 110 into IP data packets for receipt by an attached user device. Additionally, the cable modems 108 perform the functions necessary to convert IP data packets received from the attached user device, such as user devices 114 and 116, into upstream burst signals suitable for transfer over the HFC network 110. In the example cable modem system 100, each cable modem 108 is shown supporting only a single user device for clarity. In general, each cable modem 108 is capable of supporting a plurality of user devices for communication over the cable modem system 100. User devices 114 and 116 can include personal computers, data terminal equipment, telephony devices, broadband media players, network-controlled appliances, or any other device capable of transmitting or receiving data over a packet-switched network.

In the example cable modem system 100, cable modem 108 represents a conventional DOCSIS-compliant cable modem. In other words, cable modem 108 transmits data packets to the CMTS 104 in formats that adhere to the protocols set forth in the DOCSIS specification.

Furthermore, in the example cable modem system 100, the CMTS 104 operates to receive and process data packets transmitted to it in accordance with the protocols set forth in the DOCSIS specification. The manner in which the CMTS 104 operates to receive and process data will also be described in further detail herein.

Figure 2:
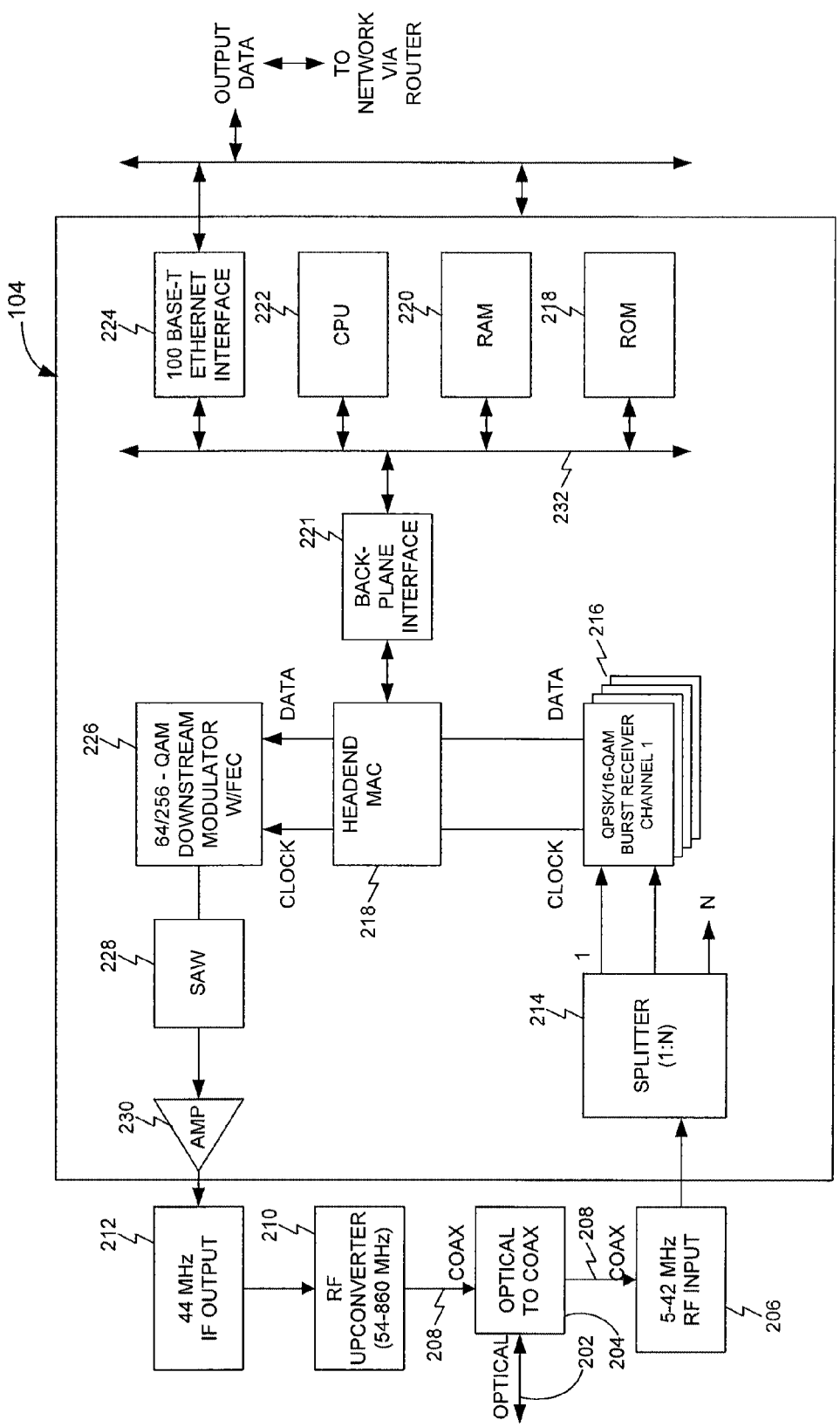
FIG. 2 is a schematic block diagram of a cable modem termination system (CMTS) in accordance with embodiments of the present invention.

B. Example Cable Modem System Components in Accordance with Embodiments of the Present Invention FIG. 2 depicts a schematic block diagram of an implementation of the CMTS 104 of cable modem system 100, which is presented by way of example, and is not intended to limit the present invention. The CMTS 104 is configured to receive and transmit signals to and from the HFC network 110, a portion of which is represented by the optical fiber 202 of FIG. 2. Accordingly, the CMTS 104 will be described in terms of a receiver portion and a transmitter portion.

The receiver portion includes an optical-to-coax stage 204, an RF input 206, a splitter 214, and a plurality of burst receivers 216. Reception begins with the receipt of upstream burst signals originating from one or more cable modems by the optical-to-coax stage 204 via the optical fiber 202. The optical-to-coax stage 204 routes the received burst signals to the radio frequency (RF) input 206 via coaxial cable 208. In embodiments, these upstream burst signals have spectral characteristics within the frequency range of roughly 5-65 MHz.

The received signals are provided by the RF input 206 to the splitter 214 of the CMTS 104, which separates the RF input signals into N separate channels. Each of the N separate channels is then provided to a separate burst receiver 216 which operates to demodulate the received signals on each channel in accordance with either a Quadrature Phase Shift Key (QPSK) or 16-256 Quadrature Amplitude Modulation (QAM) technique to recover the underlying information signals. Each burst receiver 216 also converts the underlying information signals from an analog form to digital form. This digital data is subsequently provided to the headend media access control (MAC) 219.

The headend MAC 219 operates to process the digital data in accordance with the DOCSIS specification. The functions of the headend MAC 219 can be implemented in hardware or in software. In the example implementation of FIG. 2, the functions of the headend MAC 219 are implemented both in hardware and software. Software functions of the headend MAC 219 can be stored in either the random access memory (RAM) 220 or the read-only memory (ROM) 218 and executed by the CPU 222. The headend MAC 219 is in electrical communication with these elements via a backplane interface 221 and a shared communications medium 232. In embodiments, the shared communications medium 232 can comprise a computer bus or a multiple access data network.

The headend MAC 219 is also in electrical communication with the Ethernet interface 224 via both the backplane interface 221 and the shared communications medium 232. When appropriate, Ethernet packets recovered by the headend MAC 219 are transferred to the Ethernet interface 224 for delivery to the packet-switched network 112 via a router.

The transmitter portion of the CMTS 104 includes a downstream modulator 226, a surface acoustic wave (SAW) filter 228, an amplifier 230, an intermediate frequency (IF) output 212, a radio frequency (RF) upconverter 210 and the optical-to-coax stage 204. Transmission begins with the generation of a digital broadcast signal by the headend MAC 219. The digital broadcast signal can include data originally received from the packet-switched network 112 via the Ethernet interface 224. The headend MAC 219 outputs the digital broadcast signal to the downstream modulator 226 which converts it into an analog form and modulates it onto a carrier signal in accordance with either a 64-QAM or 256-QAM technique.

The modulated carrier signal output by the downstream modulator 226 is input to the SAW filter 228 which passes only spectral components of the signal that are within a desired bandwidth. The filtered signal is then output to an amplifier 230 which amplifies it and outputs it to the IF output 212. The IF output 212 routes the signal to the RF upconverter 210, which upconverts the signal. In embodiments, the upconverted signal has spectral characteristics in the frequency range of approximately 54-860 MHz. The upconverted signal is then output to the optical-to-coax stage 204 over the coaxial cable 208. The optical-to-coax stage 204 broadcasts the signal via the optical fiber 202 of the HFC network 110.

Figure 3:
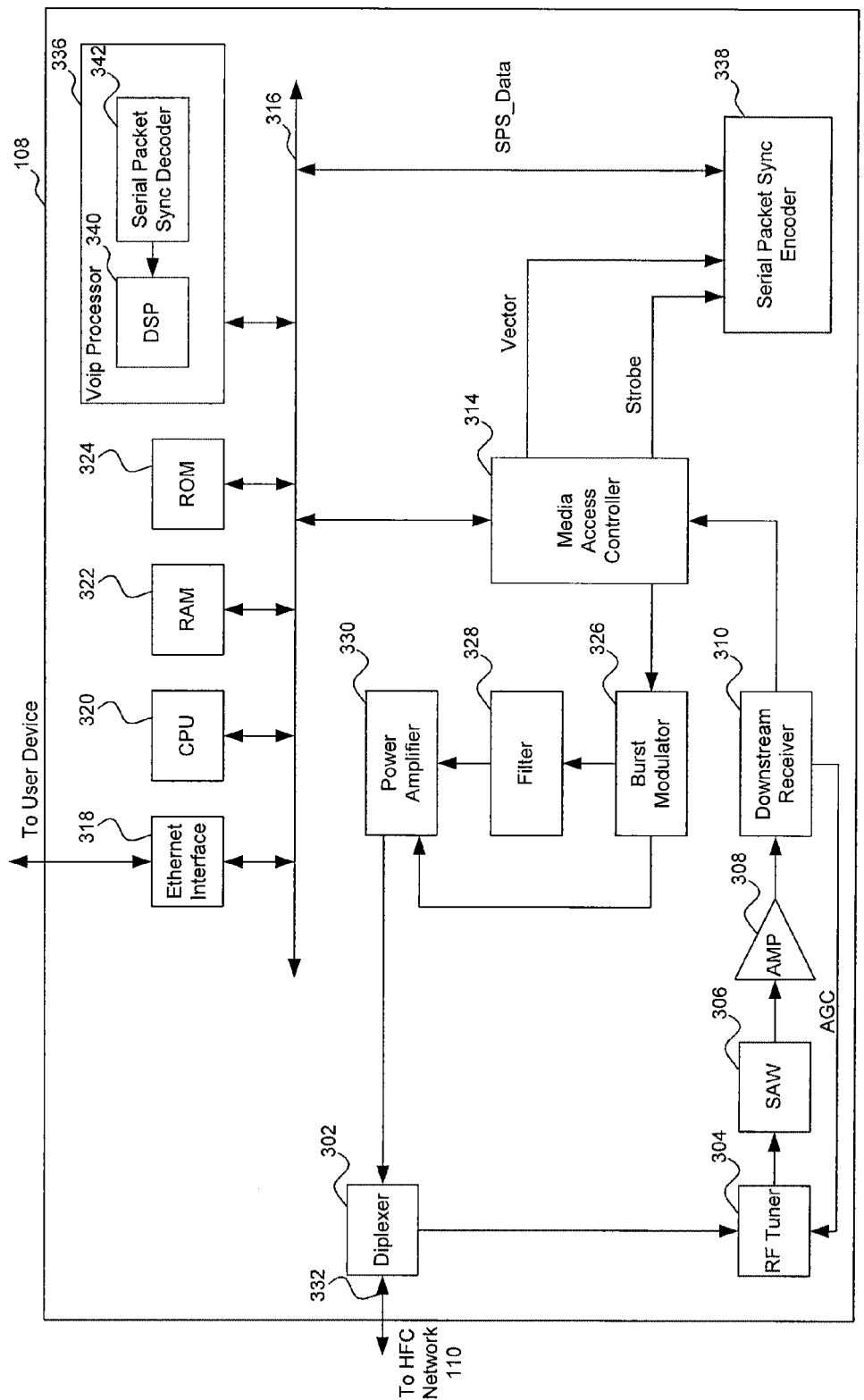
FIG. 3 is a schematic block diagram of a cable modem in accordance with embodiments of the present invention.

FIG. 3 depicts a schematic block diagram of an implementation of cable modem 108 of cable modem system 100, which is presented by way of example, and is not intended to limit the present invention. The cable modem 108 is configured to receive and transmit signals to and from the HFC network 110 via the coaxial connector 332 of FIG. 3. Accordingly, the cable modem 108 will be described in terms of a receiver portion and a transmitter portion.

The receiver portion includes a diplex filter 302, an RF tuner 304, a SAW filter 306, and amplifier 308, and a downstream receiver 310. Reception begins with the receipt of a downstream signal originating from the CMTS 104 by the diplex filter 302. The diplex filter 302 operates to isolate the downstream signal and route it to the RF tuner 304. In embodiments, the downstream signal has spectral characteristics in the frequency range of roughly 54-860 MHz. The RF tuner 304 downconverts the signal and outputs it to the SAW filter 306, which passes only spectral components of the downconverted signal that are within a desired bandwidth. The filtered signal is output to the amplifier 308 which amplifies it and passes it to the downstream receiver 310. Automatic gain controls are provided from the downstream receiver 310 to the RF tuner 304.

The downstream receiver 310 demodulates the amplified signal in accordance with a 16-QAM to 1024-QAM technique to recover the underlying information signal. The downstream receiver 310 also converts the underlying information signal from an analog form to digital form. This digital data is subsequently provided to the media access control (MAC) 314.

The MAC 314 processes the digital data, which can include, for example, Ethernet packets for transfer to an attached user device. The functions of the MAC 314 can be implemented in hardware or in software. In the example implementation of FIG. 3, the functions of the MAC 314 are implemented in both hardware and software. Software functions of the MAC 314 can be stored in either the RAM 322 or the ROM 324 and executed by the CPU 320. The MAC 314 is in electrical communication with these elements via a shared communications medium 316. In embodiments, the shared communications medium can comprise a computer bus or a multiple access data network.

The MAC 314 is also in electrical communication with the Ethernet interface 318 via the shared communications medium 316. When appropriate, Ethernet packets recovered by the MAC 314 are transferred to the Ethernet interface 318 for transfer to an attached user device.

The transmitter portion of the cable modem 108 includes an upstream burst modulator 326, a low pass filter 328, a power amplifier 330, and the diplex filter 302. Transmission begins with the construction of a data packet by the MAC 314. The data packet can include data originally received from an attached user device via the Ethernet interface 318. In accordance with embodiments of the present invention, the MAC 314 can format the data packet in compliance with the protocols set forth in the DOCSIS specification or, when appropriate, can format the data packet in compliance with a proprietary protocol that extends beyond those set forth in the DOCSIS specification, as will be described in further detail herein. The MAC 314 outputs the data packet to the upstream burst modulator 326 which converts it into analog form and modulates it onto a carrier signal in accordance with either a QPSK or 16-256 QAM technique.

The upstream burst modulator 326 outputs the modulated carrier signal to the low pass filter 328 which passes signals with spectral characteristics in a desired bandwidth. In embodiments, the desired bandwidth is within the frequency range of approximately 5-65 MHz. The filtered signals are then introduced to the power amplifier 330 which amplifies the signal and provides it to the diplex filter 302. The gain in the power amplifier 330 is regulated by the burst modulator 326. The diplex filter 302 isolates the amplified signal and transmits it upstream over the HFC network 110 during a scheduled burst opportunity.

C. Supporting Voice Data Transfer in Accordance with Embodiments of the Present Invention In an embodiment, the cable modem 108 is configured to receive and transmit voice data packets to and from the HFC network 110 via the coaxial connector 332 of FIG. 3. Accordingly, the cable modem 108 interfaces with a voice over Internet Protocol (VoIP) processor 336. VoIP processor 336 performs data collection (for example, sampling of the voice) and processing of the collected data (for example, voice data compression). The data that has been collected and processed is transmitted once a grant arrives. In the example cable modem 108, only one VoIP processor 336 is shown for clarity. In general, the number VoIP processors 336 used can vary depending on the configuration of the cable modem 108.

In an embodiment of the present invention, cable modem 108 is further provided with a serial packet sync encoder 338. The serial packet sync encoder 338 is used to generate a serial packet sync datastream (SPS_DATA) which indicates to the VoIP processor 336 that a grant has arrived. An exemplary serial packet sync datastream is illustrated in FIG. 4.

Figure 4:
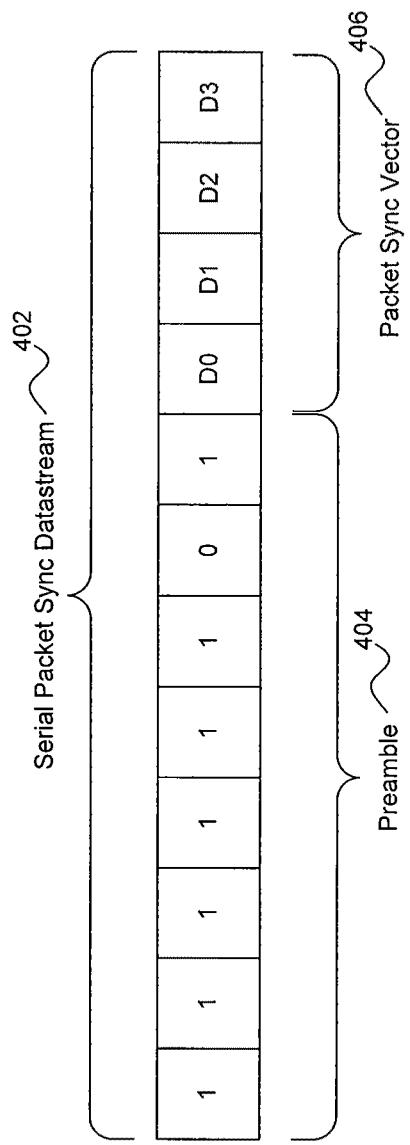
FIG. 4 illustrates an exemplary serial packet sync data stream in accordance with embodiments of the present invention.

Referring to FIG. 4, in an embodiment, serial packet sync datastream 402 is a bit sequence comprised of a preamble 404 and a packet sync vector 406. The number of bits used to represent the serial packet sync datastream 402 is selected such that the preamble 404 can be a unique bit-stream pattern. In an embodiment, the preamble 404 is a multi-bit signal that can be asserted when an event, such as a grant arrival, has occurred. An additional number of bits are used to trail the preamble and represent the packet sync vector 406. The packet sync vector 406 is a multi-bit signal which indicates a particular service flow or queue for which the bandwidth grant has been received. In an embodiment, the serial packet sync datastream 402 is a 12-bit shift sequence. In this embodiment, 8-bits are used to represent the preamble 404 and the trailing 4-bits represent the packet sync vector 406. In the embodiment shown in FIG. 4, preamble 404 is given as "11111101." Based on the teachings disclosed herein, a person skilled in the relevant arts will recognize that other bit sequence lengths' and encodings can be used without departing from the spirit and scope of the present invention.

Figure 5:
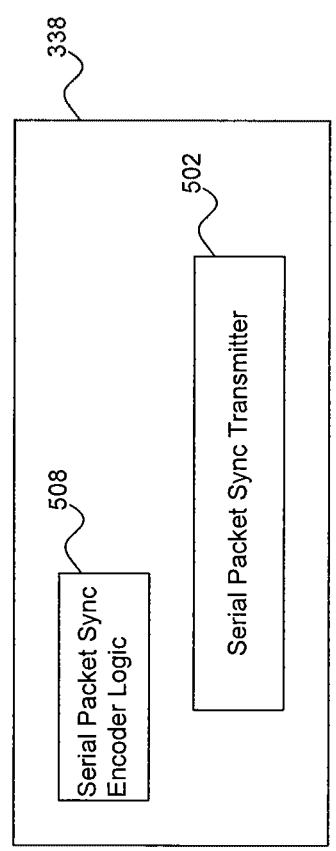
FIG. 5 is a schematic block diagram of a serial packet sync encoder in accordance with embodiments of the present invention.

FIG. 5 is a schematic block diagram of a serial packet sync encoder 338 in accordance with embodiments of the present invention. Serial packet sync encoder 338 is responsible for encoding the serial packet sync datastream 402. Serial packet sync encoder 338 is comprised of a serial packet sync transmitter 502 and serial packet sync encoder logic 508. In an embodiment, serial packet sync transmitter 502 is implemented in the form of a shift register. In this way, the serial packet sync datastream 402 can be synchronously fed in and out of the serial packet sync transmitter 502. When a grant is issued, the MAC 314 issues a packet sync strobe (FIG. 3) and packet sync vector 406. The packet sync strobe is a signal used to validate data or other signals, such as the packet sync vector 406, for example. In response, the packet sync vector 406 is latched into the serial packet sync transmitter 502.

The techniques or methods implemented by serial packet sync encoder 338 can be executed as hardware and/or software routines. In an embodiment, software routines can be executed, in part, by a serial packet sync encoder logic device 508. For example, with reference to the example implementation of cable modem 108 described in reference to FIG. 3, serial packet sync encoder logic 508 can be configured to control the operation of 338 by executing software functions with the assistance of CPU 320.

As discussed above with reference to FIG. 3, the cable modem 108 interfaces with the voice over Internet Protocol (VoIP) processor 336. VoIP processor 336 performs data collection (for example, sampling of the voice) and processing of the collected data (for example, voice data compression). An exemplary VoIP processor will now be described with reference to FIG. 3.

Referring back to FIG. 3, in an embodiment, VoIP processor 336 is comprised of a serial packet sync decoder 342 and a digital signal processor 340. The serial packet sync decoder 342 is responsible for decoding the serial packet sync datastream 402. The serial packet sync decoder 642 is further described with reference to FIG. 6.

Figure 6:
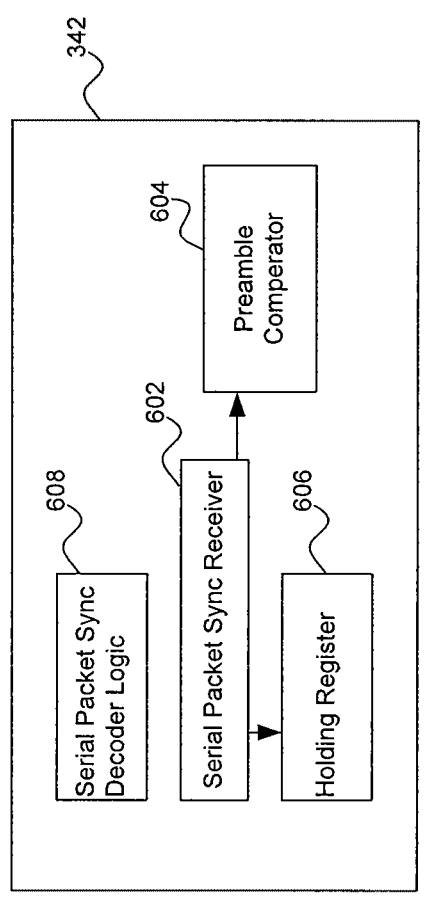
FIG. 6 is a schematic block diagram of a serial packet sync decoder in accordance with embodiments of the present invention.

As shown in FIG. 6, in an embodiment, serial packet sync decoder 342 is comprised of a serial packet sync receiver 602, preamble comparator 604, holding register 606, and serial packet sync decoder logic 608. In an embodiment, serial packet sync receiver 602 is implemented in the form of a shift register. In this way, the serial packet sync datastream 402 can be synchronously fed in and out of the serial packet sync receiver 502. Preamble comparator 604 is used to compare the bits of the serial packet sync datastream 402 with the unique preamble to determine when a match occurs. In an embodiment, pattern recognition is used to determine when the sequence of bits in the serial packet sync datastream 402 match the sequence of bits that are preselected as the preamble. Once a preamble match is detected, the packet sync vector 406 is latched into a holding register 606.

The techniques or methods implemented by serial packet sync decoder 342 can be executed as hardware and/or software routines. In an embodiment, software routines can be executed, in part, by a serial packet sync decoder logic device 608. For example, with reference to the example implementation of cable modem 108 described in reference to FIG. 3, serial packet sync decoder logic 608 can be configured to control the operation of serial packet sync decoder 342 by executing software functions with the assistance of CPU 320.

Figure 7:
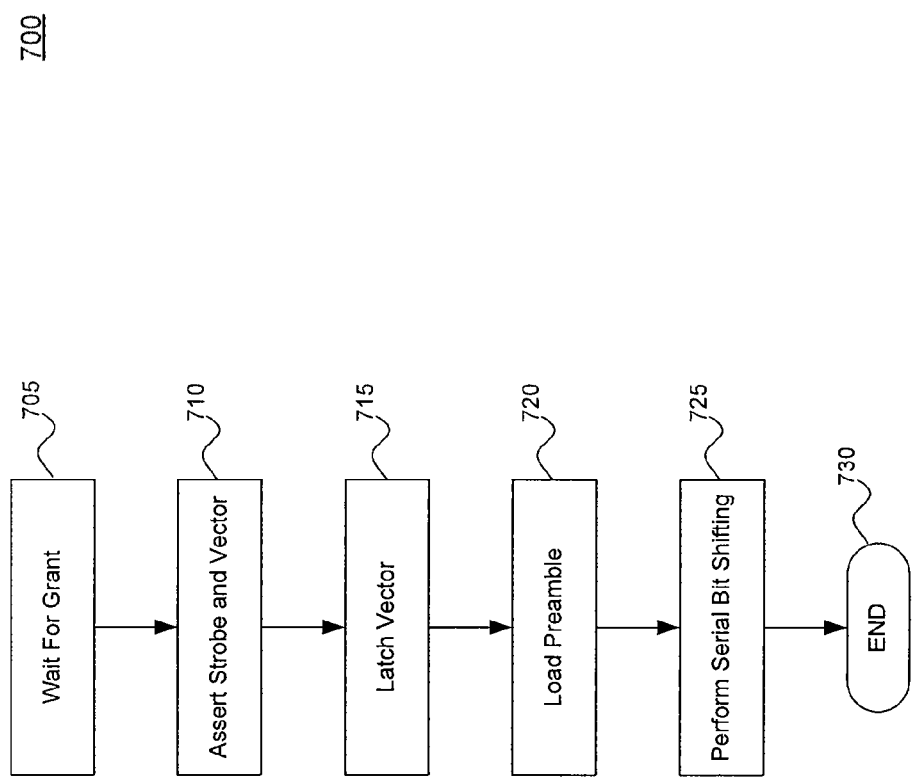
FIG. 7 is a flowchart of a method for performing serial packet encoding for synchronization in a voice processing system in accordance with embodiments of the present invention.

FIG. 7 depicts a flowchart 700 of a method for supporting serial packet synchronization in a voice processing system in accordance with embodiments of the present invention. The invention, however, is not limited to the description provided by the flowchart 700. Rather, it will be apparent to persons skilled in the relevant art(s) from the teachings provided herein that other functional flows are within the scope and spirit of the present invention. The flowchart 700 will be described with continued reference to the example CMTS 104 and cable modem 108 of the cable modem system 100, as well as in reference to the example hardware implementation of the cable modem 108 of FIG. 3.

To facilitate upstream communication, cable modems 108 are assigned specific time slots within which each can transmit data. These time slots are referred to as "grants" because the CMTS 104 is granting a particular cable modem 108 permission to use a specific period of time in the upstream. Thus, in a step 705, cable modem 108 is placed in a wait state until a grant arrives. During the wait state, a serial packet sync datastream is fed into the serial packet sync transmitter 502 of serial packet sync encoder 338. In an embodiment, the serial packet sync datastream is a non-unique pattern such as a series of all ones (1). The serial packet sync datastream is then provided to the VoIP processor 336.

Figure 9:
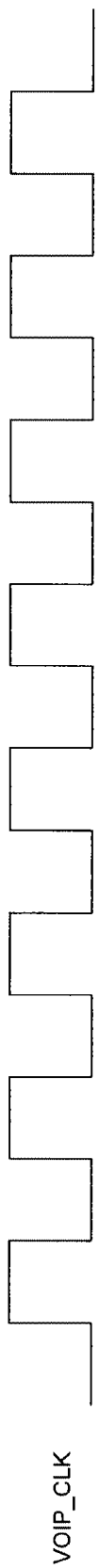
FIG. 9 illustrates an exemplary VoIP clock signal in accordance with embodiments of the present invention.

In accordance with an embodiment of the present invention, when the serial packet sync datastream is provided to the VoIP processor 336, it is synchronized to a VoIP clock signal. In this way, the circuit design complexity and transmission latency of MAC 314 and VoIP processor 336 can be minimized. In a VoIP capable cable modem system, such as cable modem system 100, the VoIP processing hardware and software (e.g., VoIP processor 336) must be synchronized to a clock that is generated by a cable modem termination system, such as CMTS 104. This clock information is passed down to a cable modem (e.g., cable modem 108) in the form of synchronization messages or a synchronous downstream clock. The clock information is then recovered by the DOCSIS MAC 314 and Phy logic (not shown) in the cable modem 108 and is used to drive the VoIP processor 336. FIG. 9 illustrates an exemplary VoIP clock signal.

Continuing with the description of flowchart 700, in response to receiving a grant, in a step 710, MAC 314 issues a packet sync strobe (FIG. 3) and packet sync vector 406.

In a step 715, the packet sync vector 406 is latched into the serial packet sync transmitter 502.

In a step 720, the preamble 404 is loaded into the serial packet sync transmitter 502. In an embodiment, the preamble is a preselected unique bit sequence. In this way pattern recognition can be used on the receiving end to verify the preamble.

Once the preamble 404 and packet sync vector 406 have been fed into the serial packet sync transmitter 502, the serial packet sync datastream is shifted out to the VoIP processor 336. (Step 725). In an embodiment, the serial packet sync datastream is shifted out synchronously with the VoIP clock. Because the serial packet sync datastream is shifted out synchronously, only a single pin is needed to pass the datastream. In this way the number of pins needed to communicate the arrival of a grant is reduced. Alternative embodiments could be used for synchronization, such as but not limited to, embedding the VoIP clock into data using manchester encoding.

The arrival of the grant signal at the cable modem 108 indicates that it is time for the cable modem 108 to send its data. Therefore, when the grant arrives, the data must be ready for transmission. As previously described, VoIP processor 336 is responsible for handling the preparation of voice data. The digital signal processor 340 of VoIP processor 336, plays a key role in this process. The operation of the digital signal processor 340 is outside of the scope of the present invention and would be apparent to a person skilled in the relevant arts. Briefly stated, however, the digital signal processor 340 supports the VoIP processor's job of performing data collection (for example, sampling of the voice) and processing of the collected data (for example, voice data compression). In an embodiment of the present invention, the serial packet sync decoder 342 is used to communicate the arrival of a grant to the VoIP processor 336. An exemplary method for communicating the grant indication will now be explained with reference to FIG. 8.

Figure 8:
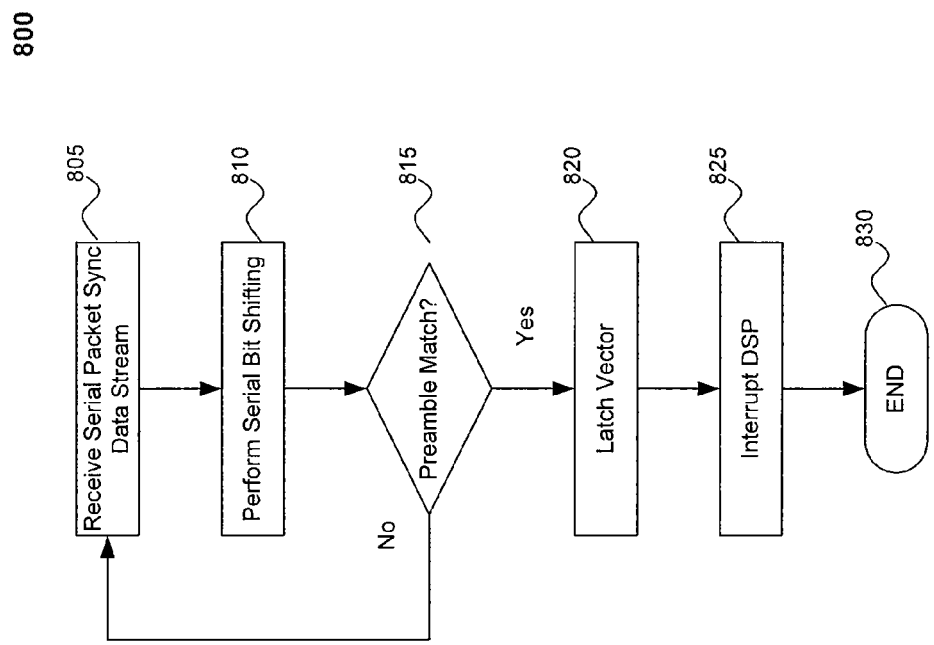
FIG. 8 is a flowchart of a method for performing serial packet decoding for synchronization in a voice processing system in accordance with embodiments of the present invention.

FIG. 8 depicts a flowchart 800 of a method for supporting serial packet synchronization in a voice processing system in accordance with embodiments of the present invention. The invention, however, is not limited to the description provided by the flowchart 800. Rather, it will be apparent to persons skilled in the relevant art(s) from the teachings provided herein that other functional flows are within the scope and spirit of the present invention. The flowchart 800 will be described with continued reference to the example CMTS 104 and cable modem 108 of the cable modem system 100, as well as in reference to the example hardware implementation of the cable modem 108 of FIG. 3.

In a step 805, a serial packet sync datastream is received by the serial packet sync decoder 342. In an embodiment, the serial packet sync receiver 602 is used to synchronously receive the serial packet sync datastream Because the serial packet sync datastream is received synchronously, only a single pin is needed to receive the datastream. In this way the number of pins needed by VoIP processor 336 to receive indication of the grants arrival is reduced.

Next, in a step 810, the serial packet sync datastream is shifted out of the serial packet sync receiver 602 and passed to the preamble comparator 604.

In a step 815, the preamble comparator 604 is used to compare the serial packet sync datastream to the preselected preamble to determine if there is a match. In an embodiment, pattern recognition is used to compare the serial packet sync datastream and the preselected preamble. In the case where the serial packet sync datastream is a non-unique bit sequence, processing would return to step 805. Once the series of bits in the serial packet sync datastream match the preamble, control passes to step 820.

In response to detecting the preamble, in a step 820, the packet sync vector 406 is latched into the holding register 606. In an embodiment, the packet sync vector 406 is identified as the bits trailing the preamble bit sequence in the serial packet sync datastream.

The receipt of the preamble serves as indication that a grant has arrived. Thus, in a step 825, an interrupt is issued to the digital signal processor 340. In response, the digital signal processor 340, handling data for the service flow indicated by the packet sync vector held in the holding register, can adjust the timing of its packet processing accordingly. This timing adjustment can therefore enable the delivery of voice packets for transmission with minimal latency. In the case where the cable modem system 100 is comprised of more than one VoIP processor 336, only the digital signal processor 340 associated with the packet sync vector 406 would be interrupted.

D. Conclusion

Various embodiments of the present invention have been described above. It should be understood that these embodiments have been presented by way of example only, and not limitation. It will be understood by those skilled in the relevant arts that various changes in form and details of the embodiments described above can be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A system, comprising:
   a media access controller that asserts a packet sync vector comprising one or more bits in response to receiving a grant; and
   a serial packet sync encoder that encodes a serial packet sync datastream, said serial packet sync datastream comprised of said packet sync vector and a preamble, wherein said serial packet sync encoder comprises a serial packet sync transmitter that transmits said serial packet sync datastream by synchronously shifting each bit of said serial packet sync datastream out of said serial packet sync transmitter.

2. The system of claim 1, wherein said serial packet sync datastream comprises a non-unique bit sequence during a wait state.

3. The system of claim 1, wherein said serial packet sync transmitter synchronizes said transmitting of said serial packet sync datastream to a VoIP clock signal.

4. The system of claim 3, wherein said VoIP clock signal is synchronized to a cable modem termination system (CMTS) clock generator.

5. The system of claim 1, wherein said serial packet sync transmitter synchronizes said transmitting of said serial packet sync datastream to a VoIP clock signal by embedding said VoIP clock signal into data using manchester encoding.

6. The system of claim 1, wherein said preamble comprises a preselected unique bit sequence.

7. The system of claim 1, wherein said serial packet sync transmitter comprises a shift register.

8. The system of claim 1, wherein said packet sync vector indicates a particular service flow or queue.

9. The system of claim 1, wherein said media access controller issues a strobe signal to said serial packet sync encoder when said grant arrives so that said packet sync vector is latched into said serial packet sync transmitter.

10. The system of claim 1, wherein said grant is issued from a cable modem termination system (CMTS).

* * * * *